Figure 1:
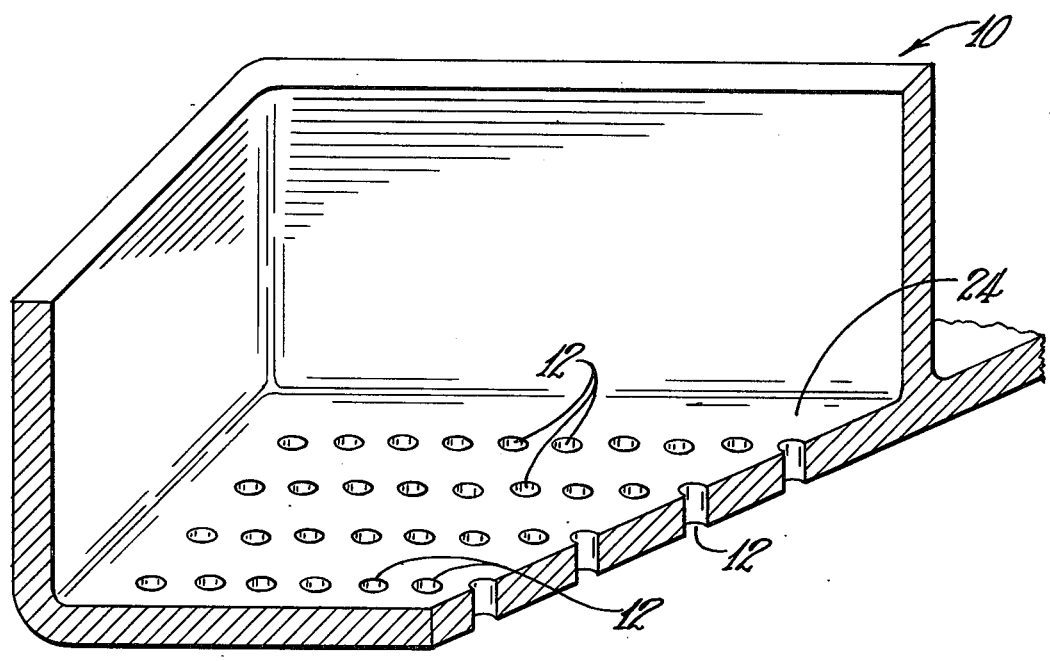

United States Patent [19]

Costin et al.

[11] 4,140,507

[45] Feb. 20, 1979

[54] BUSHING AND METHOD FOR FORMING GLASS FIBERS

[75] Inventors: Darryl J. Costin; Jay W. Hinze, both of Newark, Ohio

[73] Assignee: Owens-Corning Fiberglas Corporation, Toledo, Ohio

[21] Appl. No.: 853,055

[22] Filed: Nov. 21, 1977

Related U.S. Application Data

[63] Continuation-in-part of Ser. No. 776,671, Mar. 11, 1977, abandoned.

[51] Int. Cl.² ............................................. C03B 37/02
[52] U.S. Cl. ............................................. 65/2; 65/1; 65/374 RM
[58] Field of Search ................ 65/1, 2, 325, 374 R, 65/374 RM

[56] References Cited

U.S. PATENT DOCUMENTS

| 2,323,000 | 6/1943 | Auwarter et al. ............. 65/1 |
| 2,996,758 | 8/1961 | McFadden ................. 65/1 |
| 3,134,659 | 5/1964 | Labino ..................... 65/2 |
| 3,248,190 | 4/1966 | Woodward et al. ........... 65/1 |
| 3,350,182 | 10/1967 | Hunter et al. .............. 65/1 |
| 3,533,771 | 10/1970 | Stehl et al. .............. 65/374 R |

Primary Examiner—Arthur D. Kellogg
Attorney, Agent, or Firm—Ronald C. Hudgens; Charles F. Schroeder; Robert F. Rywalski

[57] ABSTRACT

A bushing for use in the drawing of glass filaments to form glass fibers formed of a silicon-based ceramic having a plurality of openings extending therethrough and hollow tip elements formed of a precious metal extending through the openings in the bushing. In the preferred practice of the invention, the hollow tip element overlays a ceramic spacer element which serves to prevent reaction of the precious metal with the silicon-based ceramic.

13 Claims, 2 Drawing Figures

U.S. Patent     Feb. 20, 1979     4,140,507

BUSHING AND METHOD FOR FORMING GLASS FIBERS

CROSS REFERENCE

This application is a continuation-in-part application of U.S. Ser. No. 776,671 filed on Mar. 11, 1977 now abandoned.

This invention relates to molten-glass handling apparatus and more particularly to bushings used for forming glass fibers from molten glass.

Glass fibers are formed by the rapid attenuation of streams of molten glass issuing from the glass fiber furnace or crucible. In most present-day commercial operations, the glass crucible is provided with what has become known in the art as a "bushing" in the form of a cup-shaped element provided on its bottom surface with a plurality of openings. The bushing is thus placed in a position to receive heat from a suitable source, with the bottom thereof being exposed so that the molten glass flows through the openings in the bushing to form streams of molten glass for attenuation to form glass fiber filaments.

As the art is aware, the surface conditions encountered in glass-forming operations are quite severe. The molten glass must be maintained at an elevated temperature ranging from 2,000°–3,000° F. to maintain the glass in a molten state. The corrosive character of the molten glass as well as the temperature at which it must be maintained prevents the use of ordinary materials for construction of the bushing. Alloys formed of precious metals, i.e., usually platinum, iridium and/or rhodium, are usually used to form the bushing since those elements and their alloys can withstand the high temperatures and corrosive conditions incident to prolonged contact with molten glass.

One of the difficulties which has been encountered in the use of bushing formed from precious metals stems from the fact that when air is present the precious metal or alloy is converted to its corresponding oxide which, in turn, vaporizes to result in the loss of considerable amounts of precious metal during fiber-forming operations.

Another disadvantage stemming from the use of bushings formed of precious metals arises from the fact that the bushings tend to creep or deform in service. High temperature creep or deformation of the bushings adversely affects the fiber-forming operation. Glass filaments thus formed are non-uniform, and the precious metal bushing must frequently be replaced or reworked. In addition, the continued exposure to the hot, molten glass significantly increases stress-rupture failure of the bushing.

It has been proposed in U.S. Pat. No. 3,350,182 to form a bushing with its associated "tip" of silicon carbide as an alternative to bushings formed of platinum or like precious metals. (The tip of the bushing is, in effect, a nozzle through which the molten glass flows by gravity to form the glass fiber filament.) One of the difficulties with the apparatus described in the foregoing patent is that the silicon carbide bushing tip, since it is in contact with the ambient air, corrodes at an unacceptable rate. While silicon carbide is not completely inert with respect to molten glass as the foregoing patent suggests, we have found that it does exhibit exceptional glass corrosion resistance. Glass in the molten state attacks silicon carbide in the presence of air, particularly in the vicinity of the tip.

It is accordingly an object of the present invention to provide molten glass handling equipment, for example a glass feeder, which overcomes the foregoing disadvantages.

It is a more specific object of the invention to provide a bushing for use in drawing of glass fiber filaments which utilizes the desirable characteristics of silicon-based ceramic materials, while avoiding the disadvantageous properties thereof.

In accordance with one feature of this invention there is provided an apparatus for use in drawing glass filaments comprising (a) a ceramic bushing adapted to contain molten glass and having an opening extending through a wall thereof, (b) a hollow precious metal tip element extending through said opening for passage of glass therethrough from which a fiber can be formed, and (c) ceramic means disposed intermediate said bushing and tip element for substantially preventing reaction between said ceramic bushing and said tip element. Preferably the ceramic bushing will be a silicon based ceramic, like SiC, and the latter means will be formed of chromia ($Cr_2O_3$). The latter means may be an insert or it may be a coating.

Figure 2:
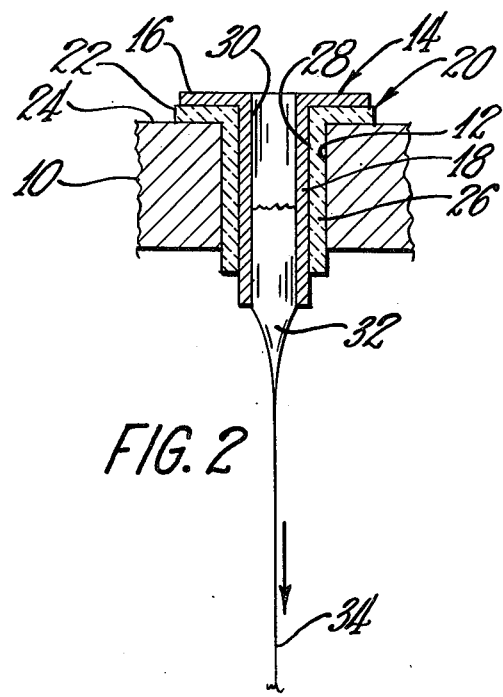

These and other objects, features and advantages of the present invention will appear more fully hereinafter; and for purposes of illustration and not of limitation, an embodiment of the present invention is shown in the accompanying drawing wherein:

FIG. 1 is a perspective view of a bushing embodying the features of this invention; and FIG. 2 is a detailed drawing illustrating a glass fiber bushing and its associated tip in accordance with the practice of the invention.

The concepts of the present invention reside in a bushing for use in the drawing of glass filaments wherein the bushing, adapted to contain molten glass and having a plurality of openings extending through the bottom thereof, is formed of a silicon-based ceramic material. Extending through each of the openings in the bottom portion of the bushing is a hollow tip element overlaying a ceramic spacer, the tip element being formed of a precious metal. Thus, in accordance with the practice of this invention, glass is maintained in the molten state in the bushing formed of the silicon-based ceramic material and flows gravitationally through the hollow tip element mounted in the openings in the bushing to form a glass stream which is attenuated to form a glass fiber filament.

One of the primary advantages of this invention is that the silicon-based ceramic material from which the bushing is formed is characterized by highly attractive creep and stress-rupture properties to afford long trouble-free service. Only the tip element is formed of a precious metal which does have the ability to withstand the corrosive and high temperature conditions afforded by the molten glass in contact with ambient air. Consequently, it is necessary with the bushing of this invention to replace only the precious metal tips as a result of volatilization during service. It has been found, quite unexpectedly, that comparable results cannot be achieved where the entire bushing, including the tip element, is formed of the silicon-based ceramic material due to the tendency of the molten glass to rapidly corrode a bushing tip formed of the silicon-based ceramic material. The result is that the bushing of this invention utilizes all the desirable properties of the silicon-based ceramic materials without suffering from its adverse properties, namely the tendency of such materials to corrode in contact with molten glass in the presence of ambient air.

Referring now to the drawings for a more detailed description of the present invention, there is shown a bushing 10 formed of ceramic material, preferably a silicon based ceramic and configured as a container to receive molten glass. The bottom of the bushing is provided with a plurality of openings 12 on which the tip elements are mounted. The details of the tip element and their relationship with the bushing 10 are shown in greater detail in FIG. 2 of the drawing. As can be seen in that figure, the openings 12 in the bushing 10 are provided with a tip element 14 having a flange portion 16 and a hollow tubular portion 18 extending through the bushing opening 12. To protect the tip element 14 from reaction with the ceramic bushing, e.g. silicon based ceramic, it is necessary to include a ceramic means disposed intermediate bushing 10 and tip element 14, for example, spacer element 20. As can be seen from this figure, the ceramic spacer element 20 can have a configuration similar to that of the tip, including a flange portion 22 overlaying the bottom surface 24 of the bushing and a tubular portion 26 extending through the bushing 10 and defining a central opening 28 through which the tip 14 extends. The bushing-spacer tip assembly can be bonded together by diffusion bonding techniques. This may be done by heating the assembly at an elevated temperature, e.g. 2600° F., for a period of time, e.g. 4–10 hours, to effect diffusion bonding. Thus, molten glass contained in the bushing flows gravitationally through the central opening 30 in the tip 14 to form a glass stream 32 which is then rapidly attenuated to a glass fiber filament 34 in accordance with known techniques.

The preferential silicon-based ceramic material employed in forming the bushing can be silicon carbide (SiC), silicon nitride ($Si_3N_4$), $Si_2ON_2$, sialons and their composites. Sialons include materials such as $Si_3N_4 \cdot Al_2O_3$. These silicon-based ceramic materials, all of which are well known to those skilled in the art, have been found to be highly suitable for use in the manufacture of the bushing; they have creep and stress-rupture properties far superior to those of the precious metal bushings most commonly employed in the prior art. Preferred silicon-based ceramics for bushing applications include those that can be resistively heated such as SiC, its composites, and the like. Silicon carbide composites include SiC composites with carbon or silicon. Furthermore, they exhibit exceptional glass corrosion resistance.

The manufacture of bushings from such silicon-based ceramic materials can be accomplished by procedures well known to those skilled in the art. For example, silicon carbide can be pyrolitically deposited by reduction of alkyl silane with hydrogen as described in U.S. Pat. No. 3,350,182, hot pressed, injection molded, or reaction bonded to final dimension. Bushings of silicon nitride can also be formed in accordance with similar well-known techniques.

When use is made of a ceramic spacer element in accordance with the preferred embodiment of the invention, the spacer element can be formed of any of a variety of inert ceramic materials. The service requirements imposed on the spacer elements are not as severe as are those imposed on the tip since the spacer element, while maintained at an elevated temperature, is not in substantial contact with the corrosive molten glass. For this purpose, use can be made of a variety of ceramic materials capable of withstanding temperature conditions existing in the bushing, provided that the ceramic material is not reactive to any significant extent with the precious metal forming the tip. It has been found that good results are frequently obtained when the spacer element is formed of chromium oxide ($Cr_2O_3$).

The bushing of the present invention, formed from a silicon-based ceramic material, has significantly improved creep and stress-rupture properties as compared to precious metals and their alloys commonly used to form such bushings. To demonstrate that fact, articles made from silicon nitride and a platinum alloy containing 25% rhodium were each tested at a temperature of 2300° F. The stress-rupture life and minimum creep rate for each material was determined as set forth below in Table I.

TABLE I

| | Creep and Stress-Rupture Properties Of Hot-Pressed $Si_3N_4$ Compared With Platinum-25% Rhodium Alloy | | | |
|---|---|---|---|---|
| Material | Stress (psi) | Temp. (° F) | Stress-Rupture Life (Hours) | Minimum Creep Rate (in/in/hr) |
| $Si_3N_4$ | 5000 | 2300 | 4000.0 | $2 \times 10^{-5}$ |
| Platinum-25% Rhodium | 5000 | 2300 | 2.4 | $6.2 \times 10^{-2}$ |

The tests demonstrate that the silicon nitride, a commercially available material from Norton under the trade name "HS 130," had dramatically superior properties compared to the platinum-rhodium alloy.

The improved mechanical properties of bushings formed from the silicon-based ceramic material in accordance with the practice of this invention should result in a significant increase in the service life of a bushing, compared with the prior art practice of using bushings formed of precious metals. In addition, the loss of precious metals through volatilization is limited in this invention to losses from the tips, the only part of the bushing formed of a precious metal.

In the preferred practice of the invention, the ceramic spacer, preferably formed of chromium oxide, serves as a barrier between the silicon-based material forming the bushing and the precious metal forming the tip. Otherwise, there is a tendency for reaction of the platinum with the silicon-based ceramic and vice versa to form a low-melting platinum-silicide eutectic. Consequently, the present invention affords improved strength and mechanical properties in the bushing without eliminating the favorable wettability characteristics of the precious metal.

In an alternate embodiment of this invention the ceramic means disposed intermediate bushing 10 and tip element 14, for substantially preventing degradative reaction between those two members, may be a coating. This coating, may be applied to either member prior to assembly of the composite glass feeder, but, preferably, will be applied to bushing 10, in which case, if desired, selective areas of the bushing may be masked. Any of a wide variety of known coating techniques may be employed for this purpose as, for example, vapor deposition, sputtering, or pack cementation.

It will be understood that various modifications and changes can be made in the details of construction, formulation, and use without departing from the spirit of the invention, especially as defined in the following claims.

We claim:

1. Apparatus for use in drawing glass filaments comprising:
   (a) a bushing adapted to contain molten glass, said bushing being formed of a silicon-based ceramic selected from the group consisting of SiC, $Si_3N_4$, $Si_2ON_2$, sialons and their composites, and having a plurality of openings extending through a wall thereof;
   (b) each of said openings having a hollow ceramic spacer element extending therethrough; and
   (c) hollow tip elements each extending through a respective one of the hollow spacer elements for passage of glass therethrough from which a fiber can be drawn, said tip elements being formed of a precious metal.

2. Apparatus as defined in claim 1 wherein the precious metal is selected from the group consisting of platinum, iridium, rhodium and alloys thereof.

3. Apparatus as defined in claim 1 wherein the ceramic spacer elements are formed of a material serving as a barrier to prevent reaction between the silicon-based ceramic and the precious metal tips.

4. Apparatus as defined in claim 1 wherein the ceramic spacer elements are formed of chromium oxide.

5. Apparatus as defined in claim 1 wherein the tips are formed of a platinum-rhodium alloy.

6. Apparatus as defined in claim 1 wherein the silicon-based ceramic bushing is adapted to being resistively heated.

7. Apparatus as defined in claim 1 wherein the silicon-based ceramic is silicon carbide or its composites.

8. Apparatus as defined in claim 1 wherein the silicon-based ceramic is $Si_3N_4$.

9. A method of forming glass filaments to afford long trouble free service comprising the steps of:
   (a) providing molten glass within a bushing formed of a silicon-based ceramic selected from the group consisting of SiC, $Si_3N_4$, $Si_2ON_2$, sialons and their composites, and having a plurality of openings extending through a wall thereof; each of said openings having a hollow ceramic spacer element extending therethrough; and hollow tip elements each extending through a respective one of the hollow spacer elements for passage of glass therethrough from which a fiber can be drawn, said tip elements being formed of a precious metal,
   (b) passing the molten glass through the hollow tip elements; and
   (c) attenuating the glass streams flowing through the tip elements to form glass filaments.

10. Apparatus for use in drawing glass filaments comprising
    (a) a silicon based ceramic bushing adapted to contain molten glass and having an opening extending through a wall thereof,
    (b) a hollow precious metal tip element extending through said opening for passage of glass therethrough from which a fiber can be formed, and
    (c) ceramic means formed of chromia disposed intermediate said bushing and tip element for substantially preventing reaction between said ceramic bushing and said tip element.

11. The apparatus of claim 10 wherein said means is a coating.

12. The apparatus of claim 10 wherein said apparatus is a diffusion bonded unitary structure.

13. The process for producing a glass fiber to afford long trouble free service comprising the steps of:
    (i) providing a molten fiberizable glass within a glass feeder comprised of:
       (a) a silicon based ceramic bushing adapted to contain molten glass and having an opening extending through a wall thereof,
       (b) a hollow precious metal tip element extending through said opening for passage of glass therethrough form which a fiber can be formed, and
       (c) chromium oxide means disposed intermediate said bushing and tip element for substantially preventing reaction between said ceramic bushing and said tip element,
    (ii) passing the molten glass through said tip element, and
    (iii) attenuating the glass flowing through the tip element to form a glass fiber.

* * * * *